(No Model.) 2 Sheets—Sheet 1.
A. MORRIS.
HAND BINDER.
No. 483,468. Patented Sept. 27, 1892.
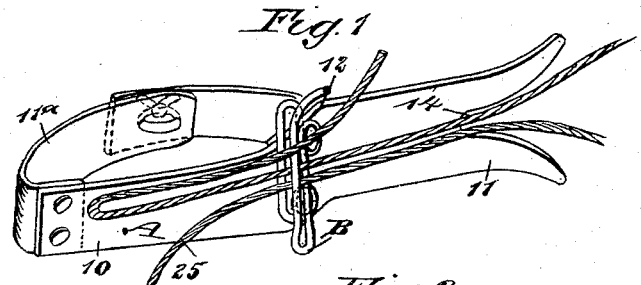
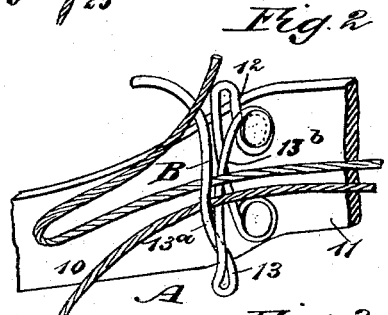
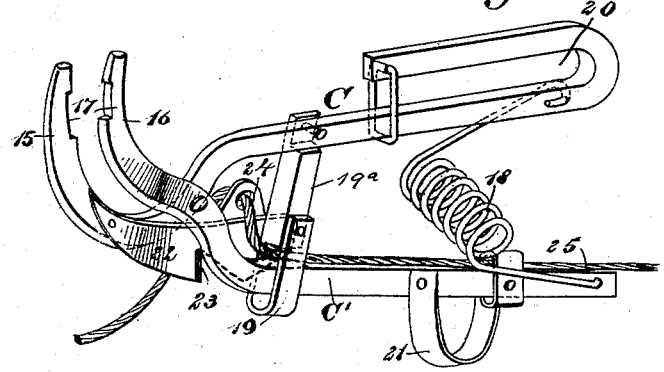
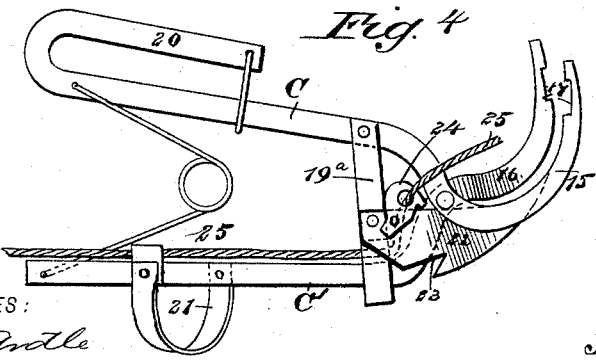
WITNESSES:
F. McArdle
C. Sedgwick
INVENTOR:
A. Morris
BY Munn & Co.
ATTORNEYS (No Model.) 2 Sheets—Sheet 2.
A. MORRIS.
HAND BINDER.
No. 483,468. Patented Sept. 27, 1892.
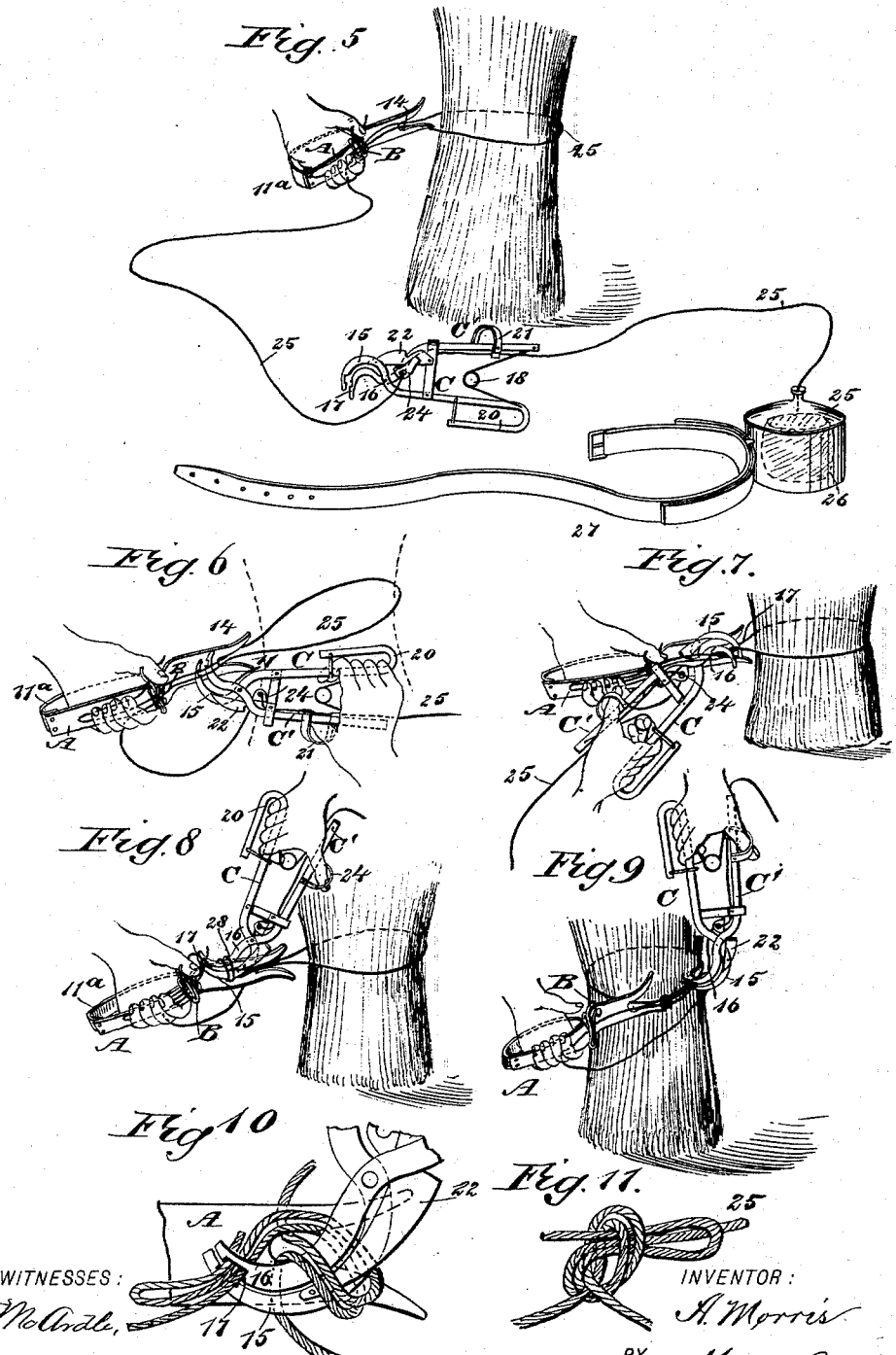
WITNESSES:
F. McArdle,
C. Sedgwick
INVENTOR:
A. Morris
BY Munn & Co.
ATTORNEYS

UNITED STATES PATENT OFFICE.

ARTHUR MORRIS, OF ROCKEFELLER, ILLINOIS.

HAND-BINDER.

SPECIFICATION forming part of Letters Patent No. 483,468, dated September 27, 1892.

Application filed January 21, 1892. Serial No. 418,756. (No model.)

*To all whom it may concern:*

Be it known that I, ARTHUR MORRIS, of Rockefeller, in the county of Lake and State of Illinois, have invented a new and useful Improvement in Hand-Binders, of which the following is a full, clear, and exact description.

My invention relates to an improvement in hand-binders, and has for its objects to simplify the construction of such implements and to provide a means whereby sheaves of grain may be expeditiously and conveniently tied and the cord or material employed to effect the tie be effectually knotted.
The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of one of the implements employed for holding the cord. Fig. 2 is an enlarged perspective view of that portion of the implement shown in Fig. 1 containing the clamping device. Fig. 3 is a perspective view of the implement employed to tie the knot. Fig. 4 is a side elevation of said implement, illustrating the reverse side of that shown in Fig. 3. Figs. 5, 6, 7, 8, and 9 illustrate the manner in which the two implements are manipulated to effect a tie. Fig. 10 is an enlarged view illustrating the manner in which the final movement producing the knot is made; and Fig. 11 is a perspective view of the knot, illustrating the manner in which it is finally finished.
The implement adapted to be carried by the left hand in producing a tie is illustrated especially in Figs. 1 and 2. This implement consists of a metal plate A, bent at its center in such a manner as to produce a shank member 10 and a guide-section 11, the guide-section being without the plane of the shank-section and standing to the rear thereof, the connection between the two sections being an angular one, as shown at 12 in Figs. 1 and 2.
The shank-section has attached thereto at its outer extremity one end of a loop 11ª, of leather or an equivalent material, the opposite end of the loop being preferably connected to the back of the connecting-section 12. This loop is ordinarily made in two parts, one adjustable upon the other, so that it can be lengthened or shortened to suit the operator. The plate is provided with a clamping device B. This device is usually secured upon the front or outer face of the connecting-section 12, and consists, ordinarily, of a wire 13, attached to the plate and bent upon and over itself to form two clamping-jaws 13ª and 13ᵇ, as is shown in Fig. 2, the wire having spring qualities. The forward end of the guide-section is bifurcated and its members flared in opposite directions to form a guide-socket 14.

The implement through the medium of which the knot is to be tied is shown in detail in Figs. 3 and 4. This implement comprises, mainly, two handles C and C', pivotally connected and made to terminate at one end of each in a curved beak, the two beaks being concentric and designated in the drawings as 15 and 16. The two beaks may be properly termed "jaws" and lie one over the other, and to effect this result one jaw or beak 15 is practically straight at its sides from the pivot of the handle, while the jaw or beak 16 is bent from the pivot in direction of and over the jaw or beak 15 to such an extent that the outer extremities of both jaws or beaks lie one over the other, as above mentioned. The movement of the beaks to and from each other need not be very great, as the beaks are intended to be separated a sufficient distance only to admit of the insertion between them of a stout cord. The curvature of the upper beak or jaw is shown in Fig. 3 of the drawings. The inner surface of each beak, near its outer end, is usually provided with a recess 17, the two recesses being so located that when the beaks are brought close together the recesses will register. The handles C and C' are normally forced apart to hold the beaks in an open position through the medium of a spring 18, and the outward movement of one of the handles is limited through the medium of a strap 19, which strap is formed at one end with a block 19ª, the block being attached to the handle C, the opposite handle C' passing through and having limited movement in the strap. The strap is located back of the pivotal point of the handle. One of the handles C is bent upon itself to form a loop 20, through which the fingers of the hand holding the implement may be passed, and a second loop 21 is formed upon the opposite handle to receive the thumb of the hand. By pressing the handles in direction of one another against the tension of the spring 18 the beaks 15 and 16 will be brought quite close together.

The implement is provided with a cutter 22, consisting of a blade, which blade is ordinarily attached to the beak 15 at one end and to the strap 19 at its opposite end, and the cutting-surface of the blade is angular, as shown at 23 in Figs. 3 and 4, the forward cutting-surface being straight and the rear surface inclined or diagonal.

The cutting-blade when located as above set forth and as shown in the drawings does not interfere with the movement of the handles of the jaws or beaks of the implement, as the blade is located to one side of the pivotal point of the handles, and from its point of attachment to the beak 15 the blade is curved in such manner that it passes inside of the handle portion of the beak 16, and the rear end of the blade is attached to the outer face of the strap.

An eye 24 is attached to this implement, ordinarily to the under portion of the cutter 22, and through this eye the cord 25 to be employed in tying a sheaf is passed. The ball of cord 25 is preferably placed in a receptacle 26, attached to a belt 27, the latter being worn around the waist of the operator, and the end of the cord 25 before being passed through the eye 24 of the right-hand implement is preferably carried upward and through suitable tension-guides along the outer portion of the sleeve of the operator or through the sleeve itself.

The operation of tying is fully illustrated in Figs. 5, 6, 7, 8, and 9. The first step is shown in Fig. 5. The clamping implement (illustrated in Figs. 1 and 2) having been placed upon the left hand, the hand of the operator passing through the loop 11$^a$ in such manner that the thumb and fingers may extend over the plate, the pincher-like implement (shown in Figs. 3 and 4) is thereupon placed upon the right hand. The cord 25 upon the pincher-like implement in the right hand is carried around the sheaf to be tied, and after the cord is passed around the sheaf the two strands are forced between the members 13$^a$ and 13$^b$ of the spring-clamp B of the left-hand implement, the strands passing from this implement to the sheaf through the guide-recess 14. The strands are held from slipping from the clamping device by the fingers and thumb of the operator grasping them back of the clamp. This movement having been effected, the beaks of the right-hand implement, they being in their closed position, are passed beneath the two strands between the guide-recess 14 of the left-hand implement and the clamp B, as shown in Fig. 6. The right-hand implement is then manipulated to carry the beaks up over the strands of the cord, as shown in Fig. 7. The right-hand implement is then further manipulated, as shown in Fig. 8, to form a loop of the strands of cord over the beak, and this is accomplished by turning the right-hand implement about half-way round. When the loop is formed around the beak, as shown at 28 in Fig. 8, the convexed surfaces of the beaks will be downward, engaging with the plate A of the left-hand implement. When the beaks of the right-hand implement are in this position, the strands of the cord are grasped between the beaks just in front of the clamp B of the left-hand implement, the strands passing between the recesses 17 in the beaks, as best shown in Fig. 10. A loop has now been formed around the beaks, and the outer ends of the strands or the continuation of the loop is grasped between the beaks and held firmly in engagement therewith by pressing the handles of the right-hand implement in direction of each other. When this position is reached, the knot is formed by drawing those portions of the strands clamped between the beaks through the loop 28, as shown in Fig. 9, and the result will be a knot of a shape substantially as shown in Fig. 11. By this means it will be observed that a sheaf may be expeditiously, conveniently, and tightly tied and the tie-band be effectually knotted, so as to maintain it in proper position, and that the implements employed in producing this result are of a simple, durable, and economic nature and are capable of being conveniently and expeditiously manipulated.

Having thus described my invention, I claim as new and desire to secure by Letters Patent—

1. In a hand-binder, the combination, with a guide-plate adapted to be held in the left hand, said plate being provided with a recess at its forward end and a clamping device, of a gripping implement adapted to be carried in the right hand, the said implement being of a pincher-like pattern, comprising spring-pressed handles pivotally connected and concentrically-curved beaks at one end of the handles, substantially as and for the purpose specified.

2. In a hand-binder, the combination, with a guide-plate adapted to be held in one hand, the said guide-plate being provided with a loop for the reception of the hand, a guide-recess at one end, and a clamping device intermediate of its ends, of a gripping implement of pincher-like pattern, comprising spring-pressed handles pivotally connected, concentrically-curved beaks at one end of the handles, and a cutting device attached to the pincher-like implement, the latter being adapted to be operated in conjunction with the guide implement, substantially as and for the purpose set forth.

3. In a hand-binder, the combination, with a guide-plate provided at one end with a guide-recess and having a clamping device attached intermediate of its length, of an implement comprising spring-pressed handles terminating at one end in concentrically-curved beaks, this latter implement being provided with a guide through which the tying band or cord is to be passed, substantially as and for the purpose specified.

4. In a hand-binder, the combination, with a guide-plate provided with a clamping device, of a pincher-like implement comprising handles pivotally connected, concentrically-curved beaks located at one end of the handles, and a guide-aperture for the reception of the cord or other material employed in tying, substantially as and for the purpose set forth.

5. In a hand-binder, an implement adapted to be carried in the right hand and to be used in connection with a guide-plate, consisting of handles pivotally connected and terminating at one end in concentrically-curved beaks, the handles being spring-pressed, a guide ring or eye connected with one of the handles, and a knife also connected with the handles, substantially as and for the purpose set forth.

ARTHUR MORRIS.

Witnesses:
GEO. MORRIS,
FRANK KERN.